United States Patent
Chen et al.

(10) Patent No.: US 12,519,433 B2
(45) Date of Patent: Jan. 6, 2026

(54) YIELD RATE BY CALIBRATING PARAMETERS OF A RADIO FREQUENCY POWER AMPLIFIER

(71) Applicant: Cypress Semiconductor Corporation, San Jose, CA (US)

(72) Inventors: Kuan-Yu Chen, Taichung (TW); Chun-Min Wang, Hsinchu (TW)

(73) Assignee: Cypress Semiconductor Corporation, San Jose, CA (US)

( * ) Notice: Subject to any disclaimer, the term of this patent is extended or adjusted under 35 U.S.C. 154(b) by 395 days.

(21) Appl. No.: 18/336,204

(22) Filed: Jun. 16, 2023

(65) Prior Publication Data

US 2024/0421785 A1    Dec. 19, 2024

(51) Int. Cl.
*H04B 17/00* (2015.01)
*H03F 3/24* (2006.01)
*H04B 1/04* (2006.01)

(52) U.S. Cl.
CPC .............. *H03F 3/24* (2013.01); *H04B 1/0466* (2013.01); *H03F 2200/105* (2013.01); *H03F 2200/451* (2013.01); *H04B 2001/0408* (2013.01)

(58) Field of Classification Search
CPC ................... H04B 1/0466; H04B 1/04; H04B 2001/0408; H04B 17/101; H04B 17/104; H04B 17/11; H04B 17/21
See application file for complete search history.

(56) References Cited

U.S. PATENT DOCUMENTS

| 8,687,676 | B2 * | 4/2014 | Palenius | H04B 1/0475 |
| | | | | 455/571 |
| 2019/0006997 | A1 * | 1/2019 | Poulin | H04B 1/0475 |
| 2022/0166389 | A1 * | 5/2022 | Hamid | H03F 3/245 |

\* cited by examiner

*Primary Examiner* — Tuan Pham

(57) ABSTRACT

Implementations disclosed describe techniques and systems for calibrating parameters of a radio frequency power amplifier. The disclosed techniques include, among other things, identifying an initial power amplifier (PA) parameter set of a radio frequency (RF) module. A plurality of candidate PA parameter sets is generated. A set of error values for each of the plurality of candidate PA parameter sets is determined. A subset of the plurality of candidate PA parameter sets is identified. Each error value of the set of error values of each candidate parameter set in the subset satisfies an error threshold. A final PA parameter set is stored.

20 Claims, 4 Drawing Sheets

| PA PARAMETER 210A | PA PARAMETER 210B | PA PARAMETER 210C |

| Power Level 230 | Target Power 240 | Measured Power 250 | Power Error Accuracy Value 260 |
|---|---|---|---|
| PL 230A | TP 240A | MP 250A | PE 260A |
| PL 230B | TP 240B | MP 250B | PE 260B |
| PL 230C | TP 240C | MP 250C | PE 260C |
| PL 230D | TP 240D | MP 250D | PE 260D |
| PL 230E | TP 240E | MP 250E | PE 260E |
| PL 230F | TP 240F | MP 250F | PE 260F |
| PL 230G | TP 240G | MP 250G | PE 260G |
| PL 230H | TP 240H | MP 250H | PE 260H |
| PL 230I | TP 240I | MP 250I | PE 260I |
| PL 230J | TP 240J | MP 250J | PE 260J |
| PL 230K | TP 240K | MP 250K | PE 260K |
| PL 230L | TP 240L | MP 250L | PE 260L |

YIELD RATE BY CALIBRATING PARAMETERS OF A RADIO FREQUENCY POWER AMPLIFIER

TECHNICAL FIELD

The present disclosure pertains to wireless devices. More specifically, the present disclosure pertains to calibrating parameters of a radio frequency power amplifier.

BACKGROUND

Personal area networks (PAN), such as Bluetooth® (BT), Bluetooth® Low Energy (BLE), Zigbee®, infrared, etc., and wireless local area networks (WLAN), such as Wi-Fi networks and other networks operating under the IEEE 802.11 or other wireless standards, provide wireless connections for various gaming, automotive infotainment, and internet of things applications.

DETAILED DESCRIPTION

Figure 1:
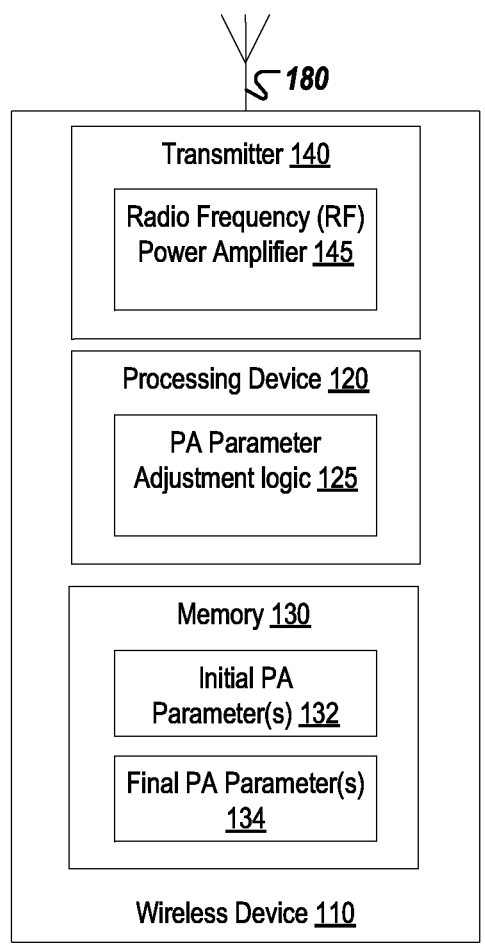
FIG. 1 is a block diagram of an example wireless device for calibrating parameters of a radio frequency power amplifier, in accordance with some implementations.

Wireless devices with PAN and WLAN radios generally use power amplifiers to convert low-power radio-frequency signals into higher-power radio-frequency power signals to drive an antenna of a transmitter.

During the manufacturing of wireless devices, based on a target output power at various power levels, a power amplifier (PA) parameter set associated with the power amplifier of a wireless device are determined. The PA parameter set is determined by performing curve fitting, such as the least square method, on the target output power at various power levels. The PA parameter set is typically stored in a memory of the wireless device and used to obtain the measured output power (or actual output power). The difference between the measured output power associated with the PA parameter set and the target output power indicates a power error accuracy at each power level for the wireless device. In production, the power error accuracy at each power level of the wireless device must pass a power error accuracy specification. The power error accuracy specification indicates an acceptable deviation in which the measured output power may deviate (e.g., plus or minus) from the target output power range. Due to chip-to-chip variation of the wireless device, testing of the wireless devices at extreme temperatures (e.g., low and high temperatures), and the inherent uncertainty of the PA parameter set due to the curve fitting method, some wireless devices fail the power error accuracy specification during production.

Aspects and implementations of the present disclosure address these and other limitations of the existing technology by enabling systems and methods of identifying one or more unique permutations of an initial PA parameter set that satisfies a predetermined power error accuracy threshold (e.g., error threshold). More specifically, various unique permutations of the initial PA parameter set (e.g., candidate PA parameter sets) are generated by varying one or more parameters of the initial parameter set. Multiple power error accuracy values (e.g., error values) are obtained for each candidate PA parameter set. Each error value is a difference between a measured output power calculated using a respective candidate PA parameter set at a power level of the wireless device and a target output power at the power level of the wireless device. One or more of the candidate PA parameter sets that satisfy the error threshold is identified by identifying each candidate PA parameter set in which each of the error values of a respective candidate PA parameter set satisfies the error threshold. In some embodiments, the error threshold may be adjusted until the number of one or more candidate PA parameter sets that satisfy the error threshold is equal to a predetermined number of candidate PA parameter sets. In some embodiments, an individual candidate PA parameter set may be selected as a final PA parameter set from the one or more of the various candidate PA parameter sets that satisfy the error threshold. The final PA parameter is stored in the memory of the wireless device for use in calculating the measured output power during production in place of the initial PA parameter set.

Aspects of the present disclosure overcome these deficiencies and others by obtaining a PA parameter set, from an initial PA parameter set produced by other methods (e.g., the curve fitting method), with improved power error accuracy, thereby increasing yield rates of the wireless device.

FIG. 1 is a diagram of one embodiment of an example network device (e.g., wireless device 110), in accordance with some embodiments. Wireless device 110 may be implemented as an integrated circuit (IC) device (e.g., disposed on a single semiconductor die). The wireless device 110 includes various modules and components, but it should be understood that some modules and components may be absent for brevity.

Wireless device 110 may include a transmitter 140 coupled to one or more antenna(s) 180 configured to transmit and receive radio waves. The antennas 180 can be a single antenna, a multiple-input, multiple-output (MIMO) antenna, multiple antennas, multiple MIMO antennas, or the like. The transmitter 140 generates a radio frequency alternating current to be applied to the one or more antenna(s) 180, thereby causing the one or more antenna(s) 180 to radiate radio waves. The transmitter 140 may include a radio frequency (RF) power amplifier 145 to increase a power of the signal, thus increasing the range of the radio waves. The RF power amplifier 145 may be coupled between the input signal and the one or more antenna(s) 180. The RF power amplifier 145 increases the power of the signal by converting a low-power radio-frequency signal into a higher-power signal. The characteristics of an amplifier, such as the RF power amplifier 145, may be governed by one or more parameters (e.g., gain, bandwidth, efficiency, linearity, noise, output dynamic range, slew rate, stability, etc.).

During the manufacturing of the wireless device, a set of target output power is identified between a minimum power level of the signal and a maximum power level of the signal. More specifically, at each power level between the minimum power level and maximum power level of the signal, a target output power associated with the power level inputted into the RF power amplifier 145 is applied to the one or more antenna(s) 180 by the RF power amplifier 145. A power amplifier (PA) parameter set (e.g., initial PA parameter set 132) of the RF power amplifier 145 may be extracted from the set of target output power and their corresponding power levels using a curve fitting method (e.g., least square method). The fitted curve produced by the curve fitting method represents a measured output power of the RF power amplifier 145 applied to the one or more antenna(s) 180 in response to the power level inputted into by the RF power amplifier 145. For example, the fitted curve may be represented as a function: (b0+b1+power level)/(1+a0*power level). Thus, according to the exemplary function of the fitted curve, the extracted initial PA parameter set 132 represents parameters of the function of the fitted curve (e.g., a0, b0, and b1).

Figure 2A:
FIG. 2A illustrates an example parameters of the radio frequency power amplifier, in accordance with some implementation.

With quick reference to FIG. 2A, initial PA parameter set 132 may be represented as PA parameter set 210. PA parameter set 210 includes PA parameter 210A, PA parameter 210B, and PA parameter 210C. For example, PA parameter 210A may correspond to a0, PA parameter 210B may correspond to b0, and PA parameter 210C may correspond to b1. The parameter and the function may be used to determine a measured output power at a specified power level. In some embodiments, the initial PA parameter set 132 may be stored in a memory 130 of the wireless device 110, which may be (or include) a non-volatile, e.g., read-only (ROM) memory, and/or a volatile, e.g., random-access (RAM), memory.

The accuracy of the fitted curve and the corresponding initial PA parameter set 132 may be assessed by identifying, at each power level, a curve fitting error (e.g., power error accuracy value). The fitted curve, corresponding to initial PA parameter set 132, is deemed adequate for production when the power error accuracy value at each power level satisfies a power error accuracy specification. The power error accuracy specification indicates an acceptable deviation in which the measured output power may deviate (e.g., plus or minus a predetermined amount) from the target output power.

Figure 2B:
FIG. 2B illustrates an exemplary chart providing a power error at each power level of the radio frequency power amplifier, in accordance with some implementation.

With quick reference to FIG. 2B, table 220 is an exemplary illustration that represents power error accuracy values (e.g., PE 260A-L of power error accuracy value 260 of FIG. 2B) calculated by obtaining a difference between measured output powers (e.g., MP250 A-L of measured power 250 of FIG. 2B) and target output powers (e.g., TP 240A-L of target power 240 of FIG. 2B) at each of the power levels (e.g., PL 230A-L of power level 230 of FIG. 2B). For example, a measured output power (e.g., MP 250A of the measured power 250) is calculated using a respective power level (PL 230A of the power level 230) and the initial PA parameter set 132 in the function of the fitted curve. The power error accuracy value (e.g., PE 260A of power error accuracy value 260) at the respective power level (PL 230A of the power level 230) is a difference between the measured output power (e.g., MP 250A of the measured power 250) at the respective power level (PL 230A of the power level 230) and the target power (e.g., TP 240A of target power 240) at the respective power level (PL 230A of the power level 230).

Wireless device 110 may further include one or more processing devices 120. In some implementations, processing device(s) 120 may include one or more central processing units (CPUs), finite state machines (FSMs), field-programmable gate arrays (FPGAs), application-specific integrated circuits (ASIC), or the like. Processing device(s) 120 may be a single processing device that executes various operations of calibrating parameters of the RF power amplifier 145 of wireless device 110. In some implementations, wireless device 110 may have a dedicated processor for calibrating parameters of the RF power amplifier 145 that is separate from a processor that executes other operations on wireless device 110 (e.g., processes associated with data transmission and reception).

Processing device(s) 120 may include a power amplifier (PA) parameter adjustment logic 125 to calibrate parameters (e.g., the initial PA parameter set 132) of the RF power amplifier 145. During the power-up of the wireless device 110, the PA parameter adjustment logic 125 is triggered to begin calibration of the parameters of the RF power amplifier 145. The PA parameter adjustment logic 125 may retrieve the initial PA parameter set 132. Depending on the embodiment, the initial PA parameter set 132 is retrieved from memory 130.

The PA parameter adjustment logic 125 may generate a plurality of candidate PA parameter sets. The PA parameter adjustment logic 125 generates a plurality of candidate PA parameter sets by varying one or more parameters of the initial PA parameter set 132 between a minimum parameter value and a maximum parameter value. The plurality of candidate PA parameter sets may be every possible permutation of the initial PA parameter set 132 produced by varying one, more than one, or all parameter sets of the initial PA parameter set 132. For example, varying a first parameter of the initial PA parameter set 132, varying a second parameter of the initial PA parameter set 132, varying a third parameter of the initial PA parameter set 132, varying the first and second parameter of the initial PA parameter set 132, varying the first and third parameter of the initial PA parameter set 132, and so on.

The PA parameter adjustment logic 125 may iterate through each of the plurality of candidate PA parameter sets and identify, at each power level, a power error accuracy value. In particular, a difference between a measured output power calculated using a respective candidate PA parameter set and a target output power at a respective power level. For example, calculating the measured output power using a permutation of a0, b0, and b1 associated with the respective candidate PA parameter set in the function associated with the fitted curve (e.g., (b0+b1+power level)/(1+a0*power level)).

The PA parameter adjustment logic 125 identifies whether each power error accuracy value of the respective candidate PA parameter satisfies a predetermined power error accuracy threshold (e.g., error threshold). The predetermined power error accuracy threshold represents an acceptable amount in which the measured output power may deviate (e.g., plus or minus) from the target output power range at a power level. The power error accuracy value of the respective candidate PA parameter satisfies the predetermined power error accuracy threshold (e.g., error threshold) if the power error accuracy value falls within a range produced by the predetermined power error accuracy threshold (e.g., +/−0.20 or between −0.20 and 0.20). In some embodiments, the predetermined power error accuracy threshold is less than the power error accuracy specification. If the respective candidate PA parameter satisfies the predetermined power error accuracy threshold, the PA parameter adjustment logic 125 adds the respective candidate PA parameter set to a list of acceptable candidate PA parameter sets.

In some embodiments, after iterating through each of the plurality of candidate PA parameter sets, the PA parameter adjustment logic 125 may gradually adjust the predetermined power error accuracy threshold until the list of acceptable candidate PA parameter sets is reduced to a predetermined number of candidate PA parameter sets (e.g., either one or a specified value). In particular, the PA parameter adjustment logic 125 determines whether the number of candidate PA parameter sets in the list of acceptable candidate PA parameter sets is less than or equal to the predetermined number of candidate PA parameter sets prior to further adjustment of the predetermined power error accuracy threshold.

If the number of candidate PA parameter sets in the list of acceptable candidate PA parameter sets is greater than the predetermined number of candidate PA parameter sets, the PA parameter adjustment logic 125 adjusts the predetermined power error accuracy threshold. In some embodiments, the predetermined power error accuracy threshold is adjusted by reducing the predetermined power error accuracy threshold stepwise by a predetermined value.

Once the predetermined power error accuracy threshold is adjusted, the PA parameter adjustment logic 125 may iterate through each candidate PA parameter set in the list of acceptable candidate PA parameter sets. The PA parameter adjustment logic 125 determines whether each power error accuracy value of the respective candidate PA parameter set in the list of acceptable candidate PA parameter sets satisfies the adjusted predetermined power error accuracy threshold. If the respective candidate PA parameter set does not satisfy the adjusted predetermined power error accuracy threshold, the PA parameter adjustment logic 125 removes the respective candidate PA parameter set from the list of acceptable candidate PA parameter sets.

If the list of acceptable candidate PA parameter sets is reduced to an individual candidate PA parameter set, the PA parameter adjustment logic 125 may identify the individual candidate PA parameter set as a final PA parameter set 134. If the list of acceptable candidate PA parameter sets contains more than an individual candidate PA parameter set, the PA parameter adjustment logic 125 may select, from the list of acceptable candidate PA parameter sets, the final PA parameter set 134. In some embodiments, the PA parameter adjustment logic 125 may select the final PA parameter set 134 by calculating, for each candidate PA parameter set in the list of acceptable candidate PA parameter sets, a sum of all the power error accuracy values of a respective candidate PA parameter set. The candidate PA parameter set with the lowest sum among the candidate PA parameter sets in the list of acceptable candidate PA parameter sets is selected as the final PA parameter set 134. In some embodiment, the final PA parameter set 134 may be selected based on other calculations of the power error accuracy values of each candidate PA parameter set in the list of acceptable candidate PA parameter sets (e.g., an average).

The PA parameter adjustment logic 125 may store the final PA parameter set 134 to memory 130 of the wireless device 110. Accordingly, the PA parameter adjustment logic 125 may direct the wireless device 110 to use the final PA parameter set 134 stored in memory 130 instead of the initial PA parameter set 132 to obtain measured power outputs of the RF power amplifier 145.

Figure 3:
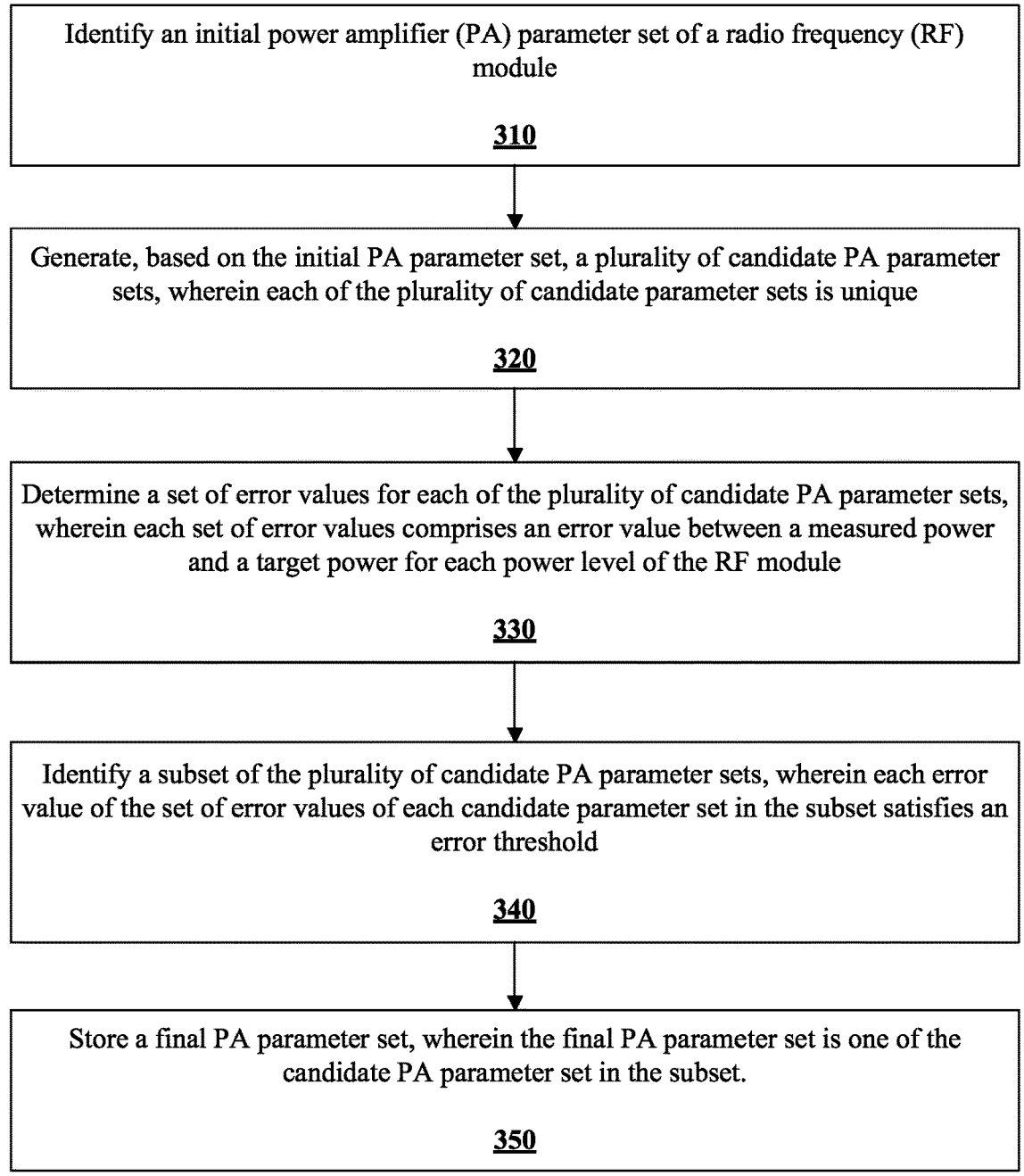
FIG. 3 is a flow diagram of an example method of calibrating parameters of a radio frequency power amplifier, in accordance with some implementations.

FIG. 3 is a flow diagram of an example method 300 for calibrating parameters of a radio frequency power amplifier, in accordance with some implementations. Method 300 may be performed by processing logic of a wireless device. The processing logic performing method 300 may include hardware (e.g., circuitry, dedicated logic, programmable logic, microcode, etc.), firmware, and/or software, or any combination thereof. In some implementations, method 300 may be performed by a processing device 120 (or any other processing logic) of wireless device 110 of FIG. 1. The processing device 120 performing method 300 may execute instructions of PA parameter adjustment logic 125. In certain implementations, method 300 may be performed by a single processing thread. Alternatively, method 300 may be performed by two or more processing threads, each thread executing one or more individual functions, routines, subroutines, or operations of the method. The processing threads implementing method 300 may be synchronized (e.g., using semaphores, critical sections, and/or other thread synchronization mechanisms). Alternatively, the processing threads implementing method 300 may be executed asynchronously with respect to each other. Various operations of method 300 may be performed in a different order compared with the order shown in FIG. 3. Some operations of method 300 may be performed concurrently with other operations. Some operations may be optional.

At block 310, method 300 may identify an initial power amplifier (PA) parameter set of a radio frequency (RF) module. The RF module (e.g., wireless device 110 of FIG. 1) may be a wireless personal area network module (or device) or a wireless local area network module (or device). The RF module may include a memory (e.g., memory 130 of FIG. 1) in which the initial PA parameter set (e.g., the initial PA parameter set 132 of FIG. 1) may be retrieved. As previously described, during manufacturing, the initial PA parameter set may be extracted by performing a curve fitting method on a set of target output power at various power levels.

At block 320, method 300 may generate, based on the initial PA parameter set, a plurality of candidate PA parameter sets. Each of the plurality of candidate parameter sets is unique. Each candidate PA parameter set of the plurality of candidate PA parameter sets is generated by varying at least one parameter of the initial PA parameter set between a minimum parameter value and a maximum parameter value. For example, a first subset of the plurality of candidate PA parameter sets may be generated by varying a first PA parameter of the initial PA parameter set between the minimum parameter value and the maximum parameter value (e.g., maximum value) while maintaining either a second PA parameter of the initial PA parameter set, a third PA parameter of the initial PA parameter set, both the second and third PA parameter of the initial PA parameter set. The second subset of the plurality of candidate PA parameter sets may be generated by varying the second PA parameter of the initial PA parameter set between the minimum parameter value and the maximum parameter value while maintaining either the first PA parameter of the initial PA parameter set, the third PA parameter of the initial PA parameter set, both the first and third PA parameter of the initial PA parameter set. The third subset of the plurality of candidate PA parameter sets may be generated by varying the third PA parameter of the initial PA parameter set between the minimum parameter value and the maximum parameter value while maintaining either the first PA parameter of the initial PA parameter set, the second PA parameter of the initial PA parameter set, both the first and second PA parameter of the initial PA parameter set.

At block 330, method 300 may determine a set of error values for each of the plurality of candidate PA parameter sets. Each set of error values may include an error value (e.g., a power error accuracy value) between a measured power (e.g., a measured power output) and a target power (e.g., a target power output) for each power level of the RF module. As previously described, the method 300 iterates through each of the plurality of candidate PA parameter sets and calculates a measured power at each power level. Each measured power is calculated using a respective power level and the initial PA parameter set in a function of a fitted curve used to extract the initial PA parameter set.

At block 340, method 300 may identify a subset of the plurality of candidate PA parameter sets. Each error value of the set of error values of each candidate parameter set in the subset satisfies an error threshold. As previously described, each error value of the set of error values of each candidate parameter set in the subset satisfies the error threshold (e.g., predetermined power error accuracy threshold) if each error value falls within a range produced by the error threshold. The error threshold may be less than the power error accuracy specification needed during production. In some embodiments, each candidate PA parameter set that satisfies the error threshold is added to a list of acceptable candidate PA parameter sets (e.g., the subset of the plurality of candidate PA parameter sets).

At block 350, method 300 may store a final PA parameter set (e.g., the final PA parameter set 134). The final PA parameter set is a candidate PA parameter set in the subset. As previously described, the subset of the plurality of candidate PA parameter sets may be further reduced by adjusting (e.g., reducing) the error threshold stepwise until the subset of the plurality of candidate PA parameter sets is reduced to an individual candidate PA parameter set. The individual candidate PA parameter set may be set as the final PA parameter set. In some embodiments, the plurality of candidate PA parameter sets may be reduced to a predetermined number of candidate PA parameter sets. If the subset of the plurality of candidate PA parameter sets contains more than an individual candidate PA parameter set, method 300 may determine a sum of the set of error values for each of the subset of the plurality of candidate PA parameter sets. The candidate PA parameter set of the subset of the plurality of candidate PA parameter sets with the lowest sum may be set as the final PA parameter set. Accordingly, the final PA parameter set may be stored in the memory (e.g., memory 130) and used in place of the initial PA parameter set.

Figure 4:
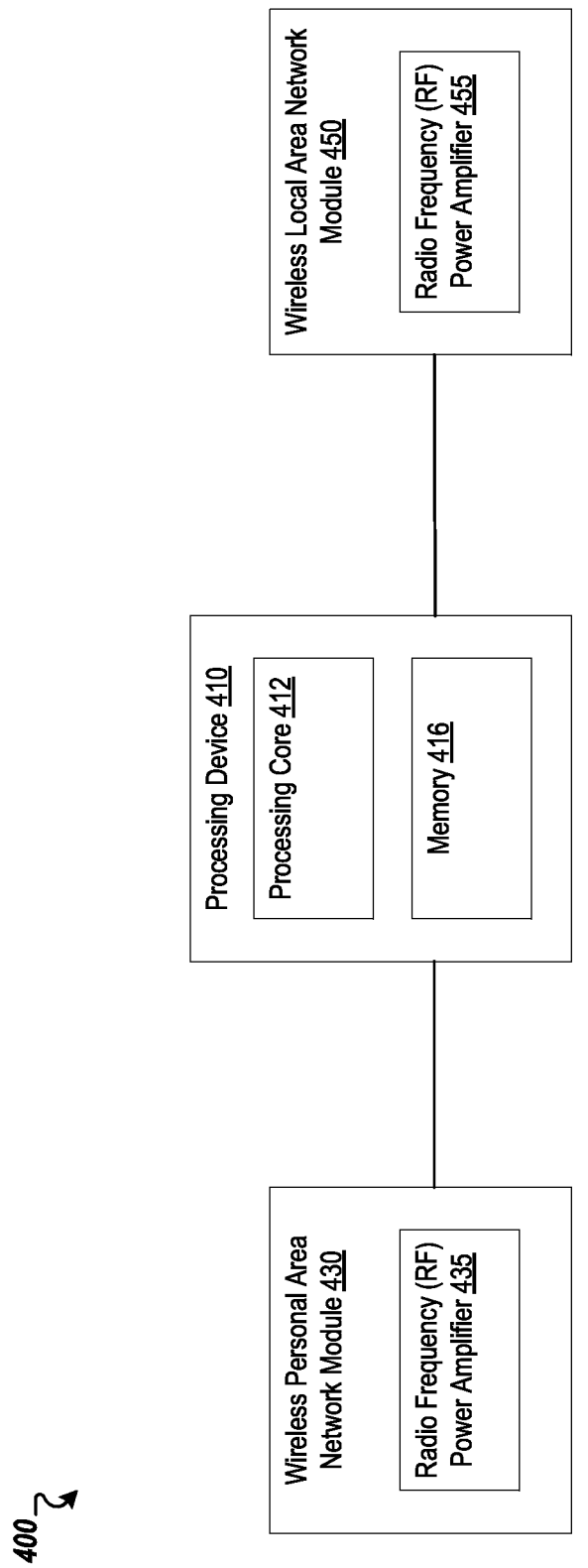
FIG. 4 is a block diagram of an example wireless device for calibrating parameters of a radio frequency power amplifier, in accordance with some implementations.

FIG. 4 is a diagram of one embodiment of a wireless device 400, in accordance with some embodiments. The wireless device 400 includes various modules and components, but it should be understood that some modules and components may be absent for brevity.

Wireless device 400 may include a processing device 410. The processing device 410 may include a processing core 412 and a memory 416. In some embodiments, the memory 416 may be (or include) a non-volatile, e.g., read-only (ROM) memory, and/or a volatile, e.g., random-access (RAM), memory. In some embodiments, the memory 416 may be one or more data registers. The processing core 412 may execute instructions to perform operations, similar to the PA parameter adjustment logic 125 of FIG. 1, to calibrate parameters (e.g., an initial PA parameter set 132) of a power amplifier.

The wireless device may include a wireless local area network (WLAN) module 450. The WLAN module 450 may include a RF power amplifier 455. During power-up of the wireless device 400, the processing core 412 may retrieve an initial PA parameter set associated with the RF power amplifier 455 of the WLAN 450 from memory 416. The processing core 412 may generate a plurality of candidate PA parameter sets by varying one or more parameters of the initial PA parameter set between a minimum parameter value and a maximum parameter value. Each candidate PA parameter set of the plurality of candidate PA parameter sets are unique. The processing core 412, for each power level, may calculate a difference between a measured output power associated with a candidate PA parameter set and a target output power (e.g., a power error accuracy value). Accordingly, the processing core 412 identifies a set of power error accuracy values for each candidate PA parameter set.

The processing core 412, for each candidate PA parameter set, may determine if each power error accuracy value of the set of power error accuracy values satisfies a predetermined power error accuracy threshold (e.g., falls within a range produced by the predetermined power error accuracy threshold). For each candidate PA parameter set in which each power error accuracy value of the set of power error accuracy values satisfies the predetermined power error accuracy threshold, the processing core 412 may add the corresponding candidate PA parameter set to a list of acceptable candidate PA parameter sets.

In some embodiments, the processing core 412 may reduce the list of acceptable candidate PA parameter sets by gradually adjusting the predetermined power error accuracy threshold and reassessing each candidate PA parameter set of the list of acceptable candidate PA parameter sets. The processing core 412 may continue to reduce the reduce the list of acceptable candidate PA parameter sets until a set number of acceptable candidate PA parameter sets in the list of acceptable candidate PA parameter sets or until there is only one acceptable candidate PA parameter set available. After adjusting the predetermined power error accuracy threshold, the processing core 412 The processing core 412, for each acceptable candidate PA parameter set of the list of acceptable candidate PA parameter sets, may determine if each power error accuracy value of the set of power error accuracy values satisfies a predetermined power error accuracy threshold. For each acceptable candidate PA parameter set in which each power error accuracy value of the set of power error accuracy values does not satisfy the predetermined power error accuracy threshold, the processing core 412 may remove the corresponding acceptable candidate PA parameter set from the list of acceptable candidate PA parameter sets.

Responsive to determining that only one acceptable candidate PA parameter set is present in the list of acceptable candidate PA parameter sets, the processing core 412 may store the one acceptable candidate PA parameter set as a final PA parameter set for RF power amplifier 455 in memory 416. As previously described, the memory 416 may be registers, volatile memory, or non-volatile memory.

The processing core 412 may determine that more than one acceptable candidate PA parameter set is present in the list of acceptable candidate PA parameter sets. The processing core 412, for each acceptable candidate PA parameter set of the list of acceptable candidate PA parameter sets, may obtain a sum of the set of power error accuracy values. The processing core 412 may compare the sum of the set of power error accuracy values associated with each acceptable candidate PA parameter set of the list of acceptable candidate PA parameter sets to identify the acceptable candidate PA parameter set with the lowest sum. The processing core 412 may store the acceptable candidate PA parameter set with the lowest sum as the final PA parameter set for RF power amplifier 455 in memory 416. As previously described, the memory 416 may be registers, volatile memory, or non-volatile memory.

The processing logic may identify the stored final PA parameter set for RF power amplifier 455 as the PA parameter set to use instead of the initial PA parameter set.

The wireless device may include a wireless personal area network (WPAN) module 430. The WPAN module 430 may include a RF power amplifier 435. During power-up of the wireless device 400, the processing core 412 may retrieve an initial PA parameter set associated with the RF power amplifier 435 of the WPAN 430 from memory 416. The processing core 412 may generate a plurality of candidate PA parameter sets by varying one or more parameters of the initial PA parameter set between a minimum parameter value and a maximum parameter value. Each candidate PA parameter set of the plurality of candidate PA parameter sets are unique. The processing core 412, for each power level, may calculate a difference between a measured output power associated with a candidate PA parameter set and a target output power (e.g., a power error accuracy value). Accordingly, the processing core 412 identifies a set of power error accuracy values for each candidate PA parameter set.

The processing core 412, for each candidate PA parameter set, may determine if each power error accuracy value of the set of power error accuracy values satisfies a predetermined power error accuracy threshold (e.g., falls within a range produced by the predetermined power error accuracy threshold). For each candidate PA parameter set in which each power error accuracy value of the set of power error accuracy values satisfies the predetermined power error accuracy threshold, the processing core 412 may add the corresponding candidate PA parameter set to a list of acceptable candidate PA parameter sets.

In some embodiments, the processing core 412 may reduce the list of acceptable candidate PA parameter sets by gradually adjusting the predetermined power error accuracy threshold and reassessing each candidate PA parameter set of the list of acceptable candidate PA parameter sets. The processing core 412 may continue to reduce the reduce the list of acceptable candidate PA parameter sets until a set number of acceptable candidate PA parameter sets in the list of acceptable candidate PA parameter sets or until there is only one acceptable candidate PA parameter set available. After adjusting the predetermined power error accuracy threshold, the processing core 412 The processing core 412, for each acceptable candidate PA parameter set of the list of acceptable candidate PA parameter sets, may determine if each power error accuracy value of the set of power error accuracy values satisfies a predetermined power error accuracy threshold. For each acceptable candidate PA parameter set in which each power error accuracy value of the set of power error accuracy values does not satisfy the predetermined power error accuracy threshold, the processing core 412 may remove the corresponding acceptable candidate PA parameter set from the list of acceptable candidate PA parameter sets.

Responsive to determining that only one acceptable candidate PA parameter set is present in the list of acceptable candidate PA parameter sets, the processing core 412 may store the one acceptable candidate PA parameter set as the final PA parameter set for RF power amplifier 435 in memory 416. As previously described, the memory 416 may be registers, volatile memory, or non-volatile memory.

The processing core 412 may determine that more than one acceptable candidate PA parameter set is present in the list of acceptable candidate PA parameter sets. The processing core 412, for each acceptable candidate PA parameter set of the list of acceptable candidate PA parameter sets, may obtain a sum of the set of power error accuracy values. The processing core 412 may compare the sum of the set of power error accuracy values associated with each acceptable candidate PA parameter set of the list of acceptable candidate PA parameter sets to identify the acceptable candidate PA parameter set with the lowest sum. The processing core 412 may store the acceptable candidate PA parameter set with the lowest sum as the final PA parameter set for RF power amplifier 435 in memory 416. As previously described, the memory 416 may be registers, volatile memory, or non-volatile memory.

The processing logic may mark the stored final PA parameter set for RF power amplifier 435 as the PA parameter set to use instead of the initial PA parameter set.

Depending on the embodiment, the wireless device may include both the WLAN module 450 and the WPAN module 430. During power-up of the wireless device 400, the processing core 412 may identify one or more modules of the wireless device 400 with a power amplifier. For example, WPAN module 430 and/or WLAN 450. The processing logic 412 may, simultaneously and/or consecutively, obtain a final PA parameter set for RF power amplifier 435 and a final PA parameter set for RF power amplifier 455.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine-readable, computer-accessible, or computer-readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplar language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
   identifying an initial power amplifier (PA) parameter set of a radio frequency (RF) module;
   generating, based on the initial PA parameter set, a plurality of candidate PA parameter sets, wherein each of the plurality of candidate parameter sets is unique;
   determining a set of error values for each of the plurality of candidate PA parameter sets, wherein each set of error values comprises an error value between a measured power and a target power for each power level of the RF module;
   identifying a subset of the plurality of candidate PA parameter sets, wherein each error value of the set of error values of each candidate parameter set in the subset satisfies an error threshold; and
   storing a final PA parameter set, wherein the final PA parameter set is one of the candidate PA parameter set in the subset.

2. The method of claim 1, wherein the measured power is calculated based on a power level and a candidate PA parameter set.

3. The method of claim 1, wherein the RF module is at least one of: a wireless personal area network (WPAN) module or a wireless local area network (WLAN) module.

4. The method of claim 1, wherein the error threshold is adjusted to adjust a number of candidate PA parameter sets in the subset to satisfy a predetermined number of candidate PA parameter sets.

5. The method of claim 1, wherein storing the final PA parameter set comprises:
   calculating a sum of the set of error values for each of the candidate PA parameter set in the subset; and
   identifying a candidate PA parameter set among the subset with a lowest sum, wherein the candidate PA parameter set with the lowest sum is the final PA parameter set.

6. The method of claim 1, wherein generating the plurality of candidate parameter sets comprises:

generating a first subset of the plurality of candidate parameter sets by varying a first PA parameter of the initial PA parameter set between a minimum parameter value and a maximum parameter value while maintaining at least one of: a second PA parameter of the initial PA parameter set or a third PA parameter of the initial PA parameter set.

7. The method of claim 1, wherein generating the plurality of candidate parameter sets comprises:
   generating a second subset of the plurality of candidate parameter sets by varying a second PA parameter of the initial PA parameter set between a minimum parameter value and a maximum parameter value while maintaining at least one of: a first PA parameter of the initial PA parameter set or a third PA parameter of the initial PA parameter set.

8. The method of claim 1, wherein generating the plurality of candidate parameter sets comprises:
   generating a third subset of the plurality of candidate parameter sets by varying a third PA parameter of the initial PA parameter set between a minimum parameter value and a maximum parameter value while maintaining at least one of: a first PA parameter of the initial PA parameter set or a second PA parameter of the initial PA parameter set.

9. An radio frequency (RF) module comprising:
   a power amplifier of a radio frequency (RF) module; and
   a processing device coupled to the power amplifier, wherein the processing device is to:
   identify an initial power amplifier (PA) parameter set of the power amplifier;
   generate, based on the initial PA parameter set, a plurality of candidate PA parameter sets, wherein each of the plurality of candidate parameter sets is unique;
   determine a set of error values for each of the plurality of candidate PA parameter sets, wherein each set of error values comprises an error value between a measured power and a target power for each power level of the RF module;
   identify a subset of the plurality of candidate PA parameter sets, wherein each error value of the set of error values of each candidate parameter set in the subset satisfies an error threshold; and
   store a final PA parameter set, wherein the final PA parameter set is one of the candidate PA parameter set in the subset.

10. The radio frequency (RF) module of claim 9, wherein the measured power is calculated based on a power level and a candidate PA parameter set.

11. The radio frequency (RF) module of claim 9, wherein the RF module is at least one of: a wireless personal area network (WPAN) module or a wireless local area network (WLAN) module.

12. The radio frequency (RF) module of claim 9, wherein the error threshold is adjusted to adjust a number of candidate PA parameter sets in the subset to satisfy a predetermined number of candidate PA parameter sets.

13. The radio frequency (RF) module of claim 9, wherein storing the final PA parameter set comprises:
   calculating a sum of the set of error values for each of the candidate PA parameter set in the subset; and
   identifying a candidate PA parameter set among the subset with a lowest sum, wherein the candidate PA parameter set with the lowest sum is the final PA parameter set.

14. The radio frequency (RF) module of claim 9, wherein generating the plurality of candidate parameter sets comprises:
 generating a first subset of the plurality of candidate parameter sets by varying a first PA parameter of the initial PA parameter set between a minimum parameter value and a maximum parameter value while maintaining at least one of: a second PA parameter of the initial PA parameter set or a third PA parameter of the initial PA parameter set;
 generating a second subset of the plurality of candidate parameter sets by varying a second PA parameter of the initial PA parameter set between the minimum parameter value and the maximum parameter value while maintaining at least one of: a first PA parameter of the initial PA parameter set or a third PA parameter of the initial PA parameter set; and
 generating a third subset of the plurality of candidate parameter sets by varying a third PA parameter of the initial PA parameter set between the minimum parameter value and the maximum parameter value while maintaining at least one of: a first PA parameter of the initial PA parameter set or a second PA parameter of the initial PA parameter set.

15. A processing device comprising:
 a memory to store an initial PA parameter set of a power amplifier of a radio frequency (RF) module and a set of instructions; and
 a processing core to execute the instructions to perform operations comprising:
  generate, based on the initial PA parameter set, a plurality of candidate PA parameter sets, wherein each of the plurality of candidate parameter sets is unique;
  determine a set of error values for each of the plurality of candidate PA parameter sets, wherein each set of error values comprises an error value between a measured power and a target power for each power level of the RF module;
  identify a subset of the plurality of candidate PA parameter sets, wherein each error value of the set of error values of each candidate parameter set in the subset satisfies an error threshold; and
  store, to the memory, a final PA parameter set, wherein the final PA parameter set is one of the candidate PA parameter set in the subset.

16. The processing device of claim 15, wherein the measured power is calculated based on a power level and a candidate PA parameter set.

17. The processing device of claim 15, wherein the RF module is at least one of: a wireless personal area network (WPAN) module or a wireless local area network (WLAN) module.

18. The processing device of claim 15, wherein the error threshold is adjusted to adjust a number of candidate PA parameter sets in the subset to satisfy a predetermined number of candidate PA parameter sets.

19. The processing device of claim 15, wherein storing the final PA parameter set comprises:
 calculating a sum of the set of error values for each of the candidate PA parameter set in the subset; and
 identifying a candidate PA parameter set among the subset with a lowest sum, wherein the candidate PA parameter set with the lowest sum is the final PA parameter set.

20. The processing device of claim 15, wherein generating the plurality of candidate parameter sets comprises:
 generating a first subset of the plurality of candidate parameter sets by varying a first PA parameter of the initial PA parameter set between a minimum parameter value and a maximum parameter value while maintaining at least one of: a second PA parameter of the initial PA parameter set or a third PA parameter of the initial PA parameter set;
 generating a second subset of the plurality of candidate parameter sets by varying a second PA parameter of the initial PA parameter set between the minimum parameter value and the maximum parameter value while maintaining at least one of: a first PA parameter of the initial PA parameter set or a third PA parameter of the initial PA parameter set; and
 generating a third subset of the plurality of candidate parameter sets by varying a third PA parameter of the initial PA parameter set between the minimum parameter value and the maximum parameter value while maintaining at least one of: a first PA parameter of the initial PA parameter set or a second PA parameter of the initial PA parameter set.

* * * * *